Jan. 1, 1946.  W. A. HYLAND  2,391,975
GRAIN DRILL
Filed Sept. 14, 1942  2 Sheets-Sheet 1
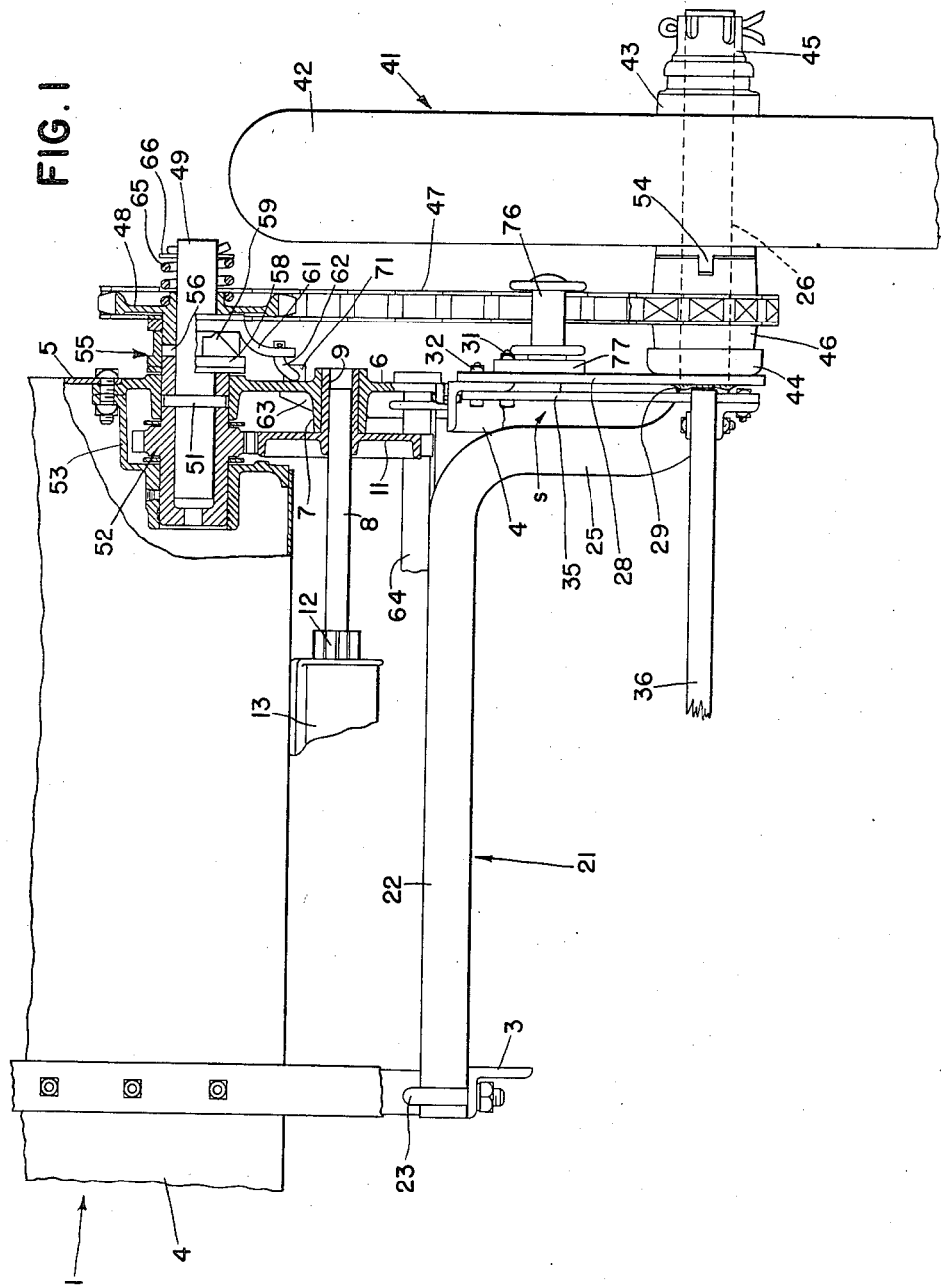
INVENTOR
William A. Hyland
BY
ATTORNEYS

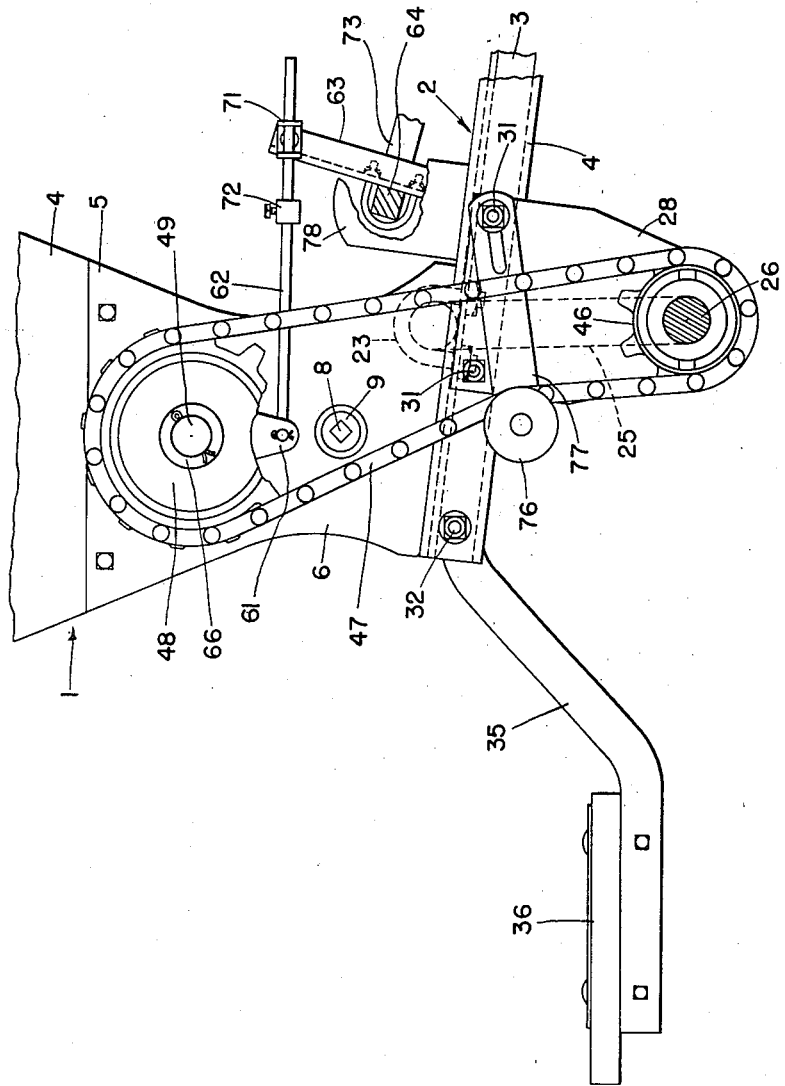

Patented Jan. 1, 1946

2,391,975

UNITED STATES PATENT OFFICE 2,391,975

GRAIN DRILL

William A. Hyland, Horicon, Wis., assignor to The Van Brunt Manufacturing Company, Horicon, Wis., a corporation of Wisconsin Application September 14, 1942, Serial No. 458,313

12 Claims. (Cl. 111—52)

The present invention relates generally to agricultural implements and more particularly to new and useful improvements in grain drills.

Grain drills and similar seeding machines are commonly mounted on relatively high wheels so as to carry the seed box high enough above the ground to accommodate the furrow openers with sufficient vertical space to permit raising and lowering them from working and transport positions. The use of supporting wheels of relatively large diameter does not readily lend itself to the use of pneumatic tires for the reason that the necessary small size but large diameter tires, by reason of their off-size dimensions, are not always available and at best are the subject of special manufacture and limited production, making such tires, even when available, expensive.

The object and general nature of the present invention is the provision of a grain drill having a special axle construction which will accommodate small size wheels on which either new or used automobile tires may be fitted. By virtue of the normally large production of conventional size automobile tires, they are relatively inexpensive so that a grain drill may without undue cost be fitted with pneumatic tires and thereby secure all of the well-known advantages of supporting machinery on pneumatic tires, such as materially lessening shocks and vibration and permitting the movement of the machines over fields, roads and the like at a much higher rate than would otherwise be advisable.

More particularly, it is a feature of this invention to provide a grain drill with a drop axle construction, that is, an axle construction in which the journal sections are disposed in a relatively low position while the main or attaching sections of the axles are disposed in a relatively high position, thus carrying the main body of the machine at the desired and necessary height above the ground which, in a grain drill, as pointed out above, is necessary so as to accommodate the furrow openers and the required spacing to permit the furrow openers being raised out of contact with the ground. According to the present invention, the drop axle construction is provided in which the overall lateral width of the implement is a minimum, with resulting minimum overhang of the parts and, more importantly, while maintaining simple direct compact driving connections between the ground wheels and the seeding mechanism. Specifically, it is a feature of this invention to provide a grain drill having a drop axle construction in which the depending or bent section of the axle is disposed laterally inwardly of the vertical end plane of the machine, so that the driving sprocket chain may extend upwardly from the wheel to the seeding shaft closely adjacent the end of the drill.

These and other objects and advantages of the present invention will be apparent to those skilled in the art after a consideration of the following detailed description, taken in conjunction with the accompanying drawings illustrating the preferred embodiment of this invention.

In the drawings:

Figure 1 is a rear view looking forwardly at the right end of a grain drill in which the principles of the present invention have been incorporated, the other end of the grain drill being of like construction; and Figure 2 is an end view of the construction shown in Figure 1.

Referring now more particularly to the drawings, the machine in which the principles of the present invention have been exemplified, comprises a grain drill, indicated generally by the reference numeral 1. The grain drill 1 includes a frame 2 which is made up of one or more laterally inner frame angles or bars 3 and laterally outer frame angles or bars 4, the frame angles or bars extending generally longitudinally. The frame 2 supports a seed box 4 that includes box ends 5 that are disposed generally in the vertical longitudinal plane of the outer frame bars 4, being supported thereon by brackets 6. The latter serve as parts of the box ends 5 and are apertured to form bushing portions 7 in which a feed shaft 8 is supported, preferably in a hub 9 forming a part of a seeding gear 11. Preferably, the feed shaft 8 is square in cross section and extends laterally of the machine, longitudinally of the seed box 4, and supports a plurality of fluted feed rolls 12 that rotate within feed cups 13 which communicate with the bottom of the seed box 4 to receive seed therefrom. The feed cups 13 form parts of an adjustable gate fluted force feed mechanism, the details of which per se do not form any part of the present invention, representing any desired form of seeding mechanism.

Each end of the grain drill is supported on a drop axle indicated in its entirety in Figure 1 by the reference numeral 21, each axle including an upper horizontal section 22, the laterally inner end of which is clipped by a U-bolt 23 to the frame bar 3. The axle 21 also includes a downwardly bent or depending section 25 which, as best shown in Figure 1, is disposed laterally inwardly of the plane of the seed box end and outer frame bar 4, the depending section 25 being bent laterally outwardly to form a laterally outwardly extending wheel receiving journal section 26 that extends laterally outwardly beyond the vertical plane of the outer frame bar 4 and seed box end 5. A rigid strut 28 is securely fixed, as by welding 29 (Figure 1) to the journal section 26 adjacent the point where it joins the depending section 25. The strut 28 extends upwardly and is of generally triangular configuration, as shown in Figure 2. The upper end of the strut 28 is apertured to receive a pair of attaching bolts 31 by which the strut is fixed rigidly to the outer frame bar 4. As best shown in Figure 1, the spacing s between the strut 28 and the depending axle section 25 is such that the strut may be fixed to the outer side of the frame bar 4 with the latter disposed between the upper end of the strut and the bend connecting the axle sections 22 and 25. The bolts 31, together with an additional bolt 32 (Figure 2), serve as means securing a bracket 35 to the frame bar 4, the bracket 35 serving to carry a footboard 36 in a rearward and downward position, as shown in Figure 2, the bracket 35 lying in the space s.

A wheel 41 carrying a pneumatic tire 42 of conventional size, such as a new or used automobile tire, is provided with a hub 43 that is journaled for rotation on the journal section 46, preferably between a sand collar 44 and an adjustable end collar 45. A sprocket 46 is disposed against the sand collar 44 and relatively closely adjacent the strut 28. A sprocket chain 47 is trained around the sprocket 46 at its lower end and at its upper end is trained around a sprocket 48 which is mounted for rotation on a stub shaft 49 pinned, as at 51, to a drive gear 52 (Figure 1). The drive gear 52 is journaled for rotation in the upper end of the bracket 6 and in a section 53 of an enclosing casing. The drive gear 52 meshes with the seeding gear 11. Lugs 54 on the wheel hub 43 drive the sprocket 46.

A clutch 55 serves as optionally controlled means for connecting the shaft 49 and the sprocket 48. The clutch 55 includes teeth 56 formed on the laterally inner end of the hub of the sprocket 48 and companion teeth formed on the laterally outer end of the hub of the gear 52. The clutch is controlled by means of a pair of cam members 58 and 59, the former being stationarily mounted on the box end bracket 6 and the other provided with an arm 61 that is connected by a longitudinally extending link 62 to an arm 63 bolted to a lift shaft 64. A spring 65 (Figure 1) is biased between a washer 66 and the sprocket gear 48 and serves normally to engage the clutch 55 and, acting through the cam members 58 and 59, to swing the arm 61 in a forward position. The link 62 (Figure 2) extends at its forward end through a swivel 71 and carries a set screw collar 72. The swivel 71 is pivoted to the arm 63 and the lift shaft 64 carries a plurality of lifting arms 73 which are connected to raise and lower the furrow openers (not shown) whenever the lift shaft 64 is actuated by the raising and lowering means (not shown). A chain tightener roller 76 is mounted on a chain tightener arm 77 that is adjustably fixed in position by the bolt 31, as shown in Figure 2, being thereby held against the strut 28. The lift shaft 64 is mounted for rocking movement in a bracket 78 carried by the frame bar 4.

In operation, the rotation of the wheel 41 acts through the sprocket chain 47 to drive the sprocket wheel 48, and the latter, in turn, drives the seeding shaft 8 through the gears 52 and 11. Whenever the lift shaft 64 is actuated to raise the tools, the arm 63 rocks rearwardly, engaging the set screw collar 72 and swinging the arm 61 in a clockwise direction (Figure 2), which acts through the cam members 58 and 59 to disengage the clutch teeth 56. When the tools are lowered the arm 63 moves away from the set screw collar 72, permitting the spring 66 to force the clutch 55 into engagement, connecting the sprocket 48 with the gear 52.

It is to be noted from Figure 1 that the drop axle 21 is so constructed and arranged that, with the depending section 25 laterally inwardly of the end of the drill and with the strut 28 directly connecting the journal section 26 with the outer frame bar 4, the driving chain and associated parts may be disposed closely adjacent the end of the grain drill, eliminating any excessive overhanging parts and reducing the overall width of the machine but without sacrificing ample clearance for the operating parts and associated frame parts, such as the frame bar 4.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A grain drill comprising a frame having a pair of laterally spaced generally longitudinally extending frame bars, a drop axle having an upper generally horizontal section, a depending section and a lower wheel-receiving journal section, means for connecting the inner end of said upper horizontal section to the inner of said frame bars so as to dispose said depending section laterally inwardly of the outer frame bar, and a strut fixed to said journal section and extending upwardly alongside said depending section and fixed to said outer frame bar.

2. A grain drill comprising a frame including laterally outer longitudinal frame bars and a plurality of inner frame bars, a seed box extending laterally the length of said frame and supported on said laterally outer frame bars, seed selecting drive mechanism at each end of said seed box, a pair of drop axles connected, respectively, with the ends of said frame, each drop axle having an upper generally horizontal section, a depending section and a lower wheel-receiving journal section, means for connecting the inner end of the upper horizontal section of each axle to one of said inner frame bars so as to dispose the depending section of the axle laterally inwardly of the plane of the adjacent outer frame bar, a wheel on the lower journal section of each axle, and drive connections extending upwardly from said wheels alongside the end of said seed box to said seed selecting drive mechanism.

3. A grain drill comprising a frame having a pair of laterally spaced generally longitudinally extending frame bars, a seed box supported thereon and having an end disposed substantially in the plane of the laterally outer frame bar, a drop axle having an upper generally horizontal section, a depending section and a lower wheel-receiving journal section extending laterally outwardly from the depending section, means for connecting the upper horizontal section of the axle to the inner frame bar so as to dispose the depending section of the axle laterally inwardly of the plane of the outer frame bar, a strut fixedly secured to the journal section of said axle and disposed generally in the vertical plane of said outer frame bar, means securing said strut to said outer frame bar, a wheel journaled on said journal section laterally outwardly of said strut, a sprocket mounted for rotation at the end of said seed box, a sprocket disposed adjacent the inner end of and driven by said wheel, and a driving connection between said sprockets extending upwardly alongside said strut and said outer frame bar.

4. A grain drill comprising a frame having an inner generally longitudinally extending frame bar and a laterally outer longitudinally extending frame bar disposed in approximately the same horizontal plane and with an open space therebetween, an axle structure comprising an upper horizontal section, a depending section and a laterally outer wheel-receiving journal section extending laterally outwardly from said depending section, means for securing said upper horizontal section to the upper portion of said inner frame bar with said depending axle section extending downwardly from between said frame bars, a strut fixed to the inner portion of said journal section and extending upwardly, said strut being spaced from said depending axle section a distance sufficient to receive therebetween said laterally outer frame bar, and means securing the upper end of said strut to said laterally outer frame bar.

5. The invention set forth in claim 4, further characterized by said strut being generally triangular in form and secured to the outer frame bar at fore and aft spaced points.

6. A grain drill comprising a frame having a pair of generally longitudinally extending laterally spaced frame bars, a grain box carried thereby and having a laterally outer end supported on the laterally outer frame bar, a drop axle having a horizontal upper section, a depending section, and a wheel-receiving lower journal section, means securing said upper horizontal section to a laterally inner frame bar with the depending section extending downwardly between the vertical planes of said frame bars, a strut secured to the journal section of said drop axle and connected at its upper end with the outer frame bar, wheel means mounted on said journal section and having a sprocket disposed in a plane laterally outwardly of said strut, a driven sprocket carried by said seed box in the plane of said first-mentioned sprocket, a driving chain connecting said sprockets, and a chain tightener mounted on said strut.

7. A grain drill comprising a frame having a pair of generally longitudinally extending laterally spaced frame bars, a grain box carried thereby and having a laterally outer end supported on the laterally outer frame bar, a drop axle having a horizontal upper section, a depending section, and a wheel-receiving lower journal section, means securing said upper horizontal section to a laterally inner frame bar with the depending section extending downwardly between the vertical planes of said frame bars, a strut secured to the journal section of said drop axle and connected at its upper end with the outer frame bar, wheel means mounted on said journal section and having a sprocket disposed in a plane laterally outwardly of said strut, a driven sprocket carried by said seed box in the plane of said first-mentioned sprocket, a driving chain connecting said sprockets, seeding mechanism carried by said grain box and including a shaft on which the upper sprocket is mounted and a clutch for controlling the connection of said sprocket to said shaft, said clutch being disposed between the end of said grain box and said upper sprocket, a rockshaft carried by the outer frame bar in fore and aft spaced relation with respect to said grain box, and a connecting link extending generally longitudinally from said rockshaft to said clutch, said link being disposed in the space between said sprocket chain and said grain box.

8. A grain drill comprising a frame having a pair of laterally spaced generally longitudinally extending frame bars, a drop axle having an upper generally horizontal section, a depending section and a lower wheel-receiving journal section, means for connecting the inner end of said upper horizontal section to the inner of said frame bars so as to dispose said depending section laterally inwardly of the outer frame bar, and a member extending from said journal section upwardly alongside said depending section and fixed to the outer frame bar.

9. A grain drill comprising a frame including a plurality of longitudinal frame bars, a seed box extending laterally the length of said frame and supported on said frame bars, seed selecting drive mechanism adjacent each end of said seed box, a pair of drop axles connected, respectively, with the ends of said frame, each drop axle having an upper generally horizontal section, a depending section and a lower wheel-receiving journal section, means for connecting the inner end of the upper horizontal section of each axle to one of the inner frame bars so as to dispose the depending section of the axle laterally inwardly of the plane of the adjacent outer frame bar, a member extending from said journal section upwardly alongside said depending section and fixed to the adjacent outer frame bar, a wheel on the lower journal section of each axle, and drive connections extending upwardly from said wheels to said seed selecting drive mechanism.

10. A grain drill comprising a frame having a pair of generally longitudinally extending laterally spaced frame bars, a grain box carried thereby and having a laterally outer end supported on the laterally outer frame bar, a drop axle having a horizontal upper section, a depending section, and a wheel-receiving lower journal section, means securing said upper horizontal section to a laterally inner frame bar with the depending section extending downwardly between the vertical planes of said frame bars, a member serving as a supporting strut receiving the journal section of said drop axle and connected at its upper end with the outer frame bar, wheel means mounted on said journal section and having a driving member disposed in a plane laterally adjacent said strut member, a driven member carried by said seed box adjacent said strut member and operatively connected with said driving member.

11. A grain drill comprising a frame having a pair of laterally spaced generally longitudinally extending frame bars, a drop axle having an upper generally horizontal section, a depending section and a lower wheel-receiving journal section, means fixing said upper horizontal section of said drop axle to said frame so as to dispose said depending section laterally inwardly of the adjacent longitudinally extending frame bar, and a member connected with said journal section and extending upwardly alongside said depending section and fixed to said adjacent frame bar.

12. A grain drill comprising a frame having laterally inner and outer portions, a drop axle having a horizontal upper section, a depending section, and a wheel-receiving lower journal section, means fixing said upper horizontal section to the inner portion of said frame with the depending section extending downwardly adjacent but inwardly of the end of the frame at that side of the drill, and a member serving as a supporting strut connected with the journal section of said drop axle and fixed at its upper end to the outer portion of said frame.

WILLIAM A. HYLAND.